UNITED STATES PATENT OFFICE.

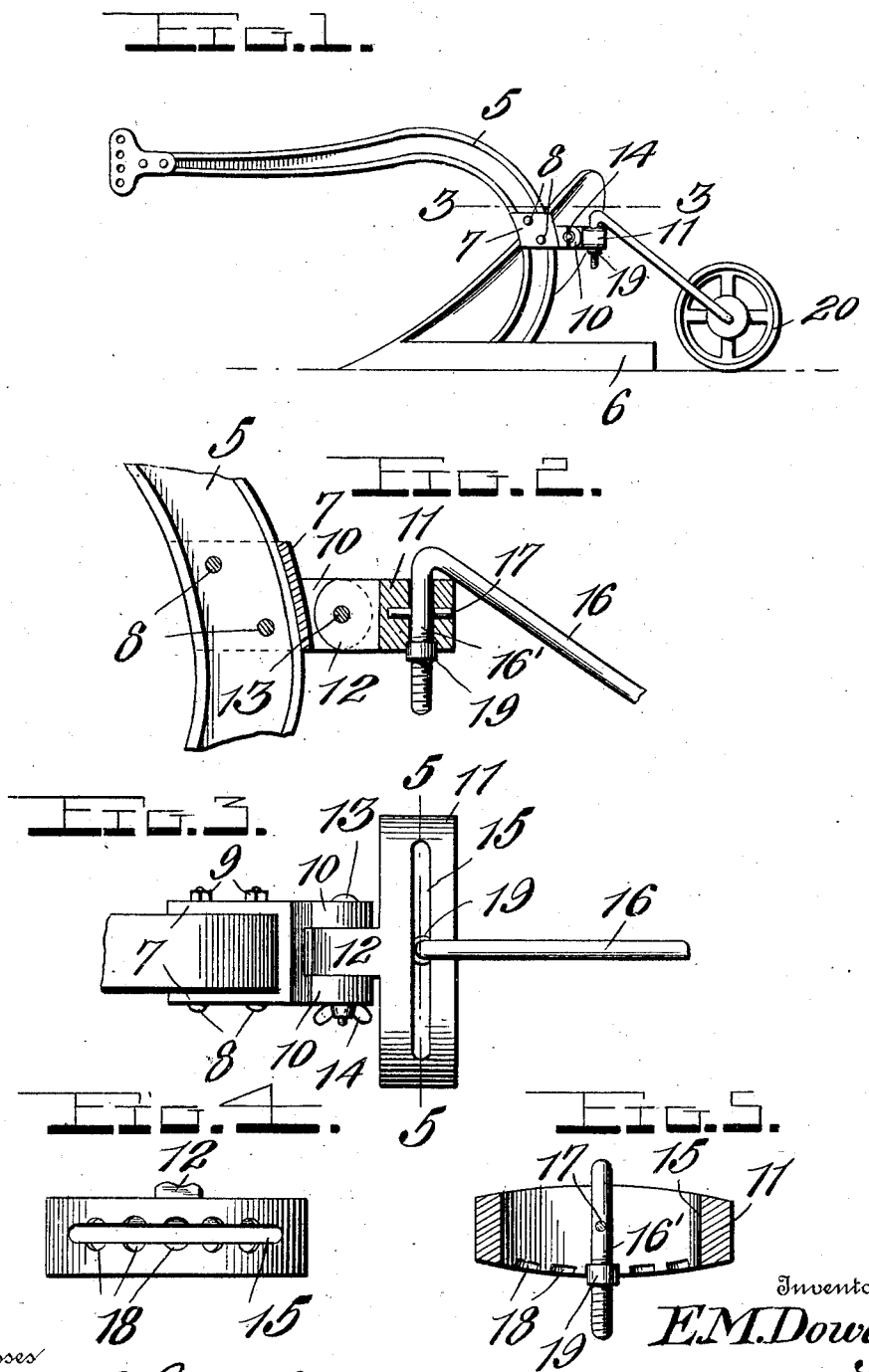

EWELL MONROE DOWDY, OF WATER VALLEY, TEXAS.

PLOW ATTACHMENT.

972,169.  Specification of Letters Patent.  Patented Oct. 11, 1910.

Application filed July 18, 1910. Serial No. 572,595.

*To all whom it may concern:*

Be it known that I, EWELL MONROE DOWDY, a citizen of the United States, residing at Water Valley, in the county of Tom Green and State of Texas, have invented certain new and useful Improvements in Plow Attachments, of which the following is a specification, reference being had to the accompanying drawings.

This invention relates to improvements in plows and more particularly to new and novel means for attaching the plow supporting wheel to the beam.

The primary object of the present invention resides in the provision of means for maintaining the end of the wheel supporting rod or shank upon the plow beam so that it may be easily and quickly adjusted to angularly position the supporting wheel and dispose the same in the furrow.

Another object is to provide means for removably attaching the supporting wheel to the plow beam so that the wheel may be raised or lowered to regulate the depth to which the plow point enters the ground, and means for angularly adjusting the wheel and rigidly securing the same in such adjusted position so as to maintain a straight furrow.

With these and other objects in view, the invention consists of the novel features of construction, combination and arrangement of parts hereinafter fully described and claimed, and illustrated in the accompanying drawings, in which—

Figure 1 is a side elevation of a land breaking plow showing the supporting wheel attached to the beam thereof; Fig. 2 is an enlarged detail vertical section; Fig. 3 is a section taken on the line 3—3 of Fig. 1; Fig. 4 is a bottom plan view of the wheel attaching member; and Fig. 5 is a transverse section taken on the line 5—5 of Fig. 3.

Referring more particularly to the drawings 5 designates the plow beam which may be connected to the machine frame in any desired manner. The mold board 6 and the plow point may be of any conventional form, the construction of the plow itself forming no part of the present invention.

In the construction of wheel supported plows as commonly used, the wheel supporting rod or shank is offset to dispose the supporting wheel at an angle to position the same in the furrow left by the plow, said wheel acting as a guide and preventing transverse movement of the plow point out of a straight line. It is with a view to eliminating the necessity of thus offsetting the wheel supporting rod and to provide means whereby the wheel may be adjusted at various angles that the present invention is devised. I accomplish this result in the following manner:—The wheel attaching member 7 consists of a substantially U-shaped plate which embraces the plow beam and is rigidly secured thereto by means of the bolts 8 extending through the beam and plate and having the nuts 9 threaded upon their ends. Spaced ears 10 are integrally formed on the intermediate portion of this plate and extend rearwardly of the plow beam. The wheel supporting block 11 is centrally formed with a laterally extending ear 12 upon one edge which is adapted to be disposed between the spaced ears 11 and is rigidly secured against movement therebetween by a bolt 13. Upon the end of this bolt a wing nut 14 is threaded. By loosening the nut the intermediate ear 12 carried by the block 11 may be pivotally moved on the bolt to raise or lower the supporting wheel which is secured in its adjusted position by threading the nut 14 inwardly to clamp the ears together. The head or block 11 is formed with its upper and lower surfaces longitudinally convexed. A longitudinal slot 15 is also provided in the block 11 and in this slot the angularly disposed end 16' of the wheel supporting rod or shank 16 is disposed. The end of the shank 16 is centrally pivoted in the slot by means of the pin 17. The bottom convexed surface of the block 11 is formed with a plurality of recesses 18 at the longitudinal edges of the slot 15. These recesses are adapted to receive the circular nut 19 which is threaded upon the lower end of the angularly disposed portion of the shank 16. When this nut is threaded into the recess in binding engagement with the block, it will be obvious that any movement of the shank upon the pin 17 is rendered impossible. The shank 16 extends downwardly and rearwardly at an angle to the plow beam and has mounted upon its lower end the supporting wheel 20. This wheel may be arranged on the end of the shank in any desired manner and is adapted to travel in the furrow made by the plow in its movement over the ground.

In the practical operation of the invention, when it is desired to angularly adjust the wheel 20, the nut 19 on the end of the shank 16 is loosened to dispose the same below the supporting block 11. The shank 16 is then swung upon the pivot pin 17 over the convexed surface of the supporting block until the proper inclination of the wheel 20 is secured. The nut 19 is then adjusted and engaged in the oppositely disposed recesses 18 at any desired point in the length of the longitudinal slot 15. Any desired number of these recesses may be provided whereby a greater or less extent of adjustment of the supporting wheel and its shank can be obtained. The manner in which the wheel may be raised or lowered upon the attaching member has been previously described and by means of such adjustment the point of the plow may be caused to enter the ground to any desired depth.

From the foregoing it will be seen that I have devised an extremely simple and novel attaching means for the plow supporting wheel so that it may be easily and quickly adjusted. The necessity for offsetting the wheel supporting shank as is commonly done, is entirely eliminated, thus simplifying the construction of the device and reducing the cost thereof to a minimum. The wheel and its support may be entirely removed from the plow beam and attached to other plows which it may be desired to use, so that but one supporting wheel is necessary for any number of plows. The device is also extremely durable and highly efficient in practical operation.

While I have shown and described the preferred construction and arrangement of the various parts, it will be obvious that the same may be greatly modified without departing from the essential feature or sacrificing any of the advantages involved therein.

Having thus described the invention what is claimed is:—

1. In a plow, the combination with a beam, of a U-shaped attaching plate removably secured thereto and having spaced ears integrally formed therewith, a wheel supporting block pivoted between said ears, means for rigidly securing the block in position, said block having a transverse longitudinally extending slot, a wheel supporting rod angularly bent at one end and disposed in said slot, a pivot pin extending through the block and rod and centrally securing the rod in said slot for transverse pivotal movement, said block having a plurality of recesses in its under side, and a nut threaded on the end of said rod to engage in said recesses and secure the wheel in its adjusted position.

2. In a plow, the combination with a plow beam, of a U-shaped attaching plate removably secured thereto and having spaced ears integrally formed therewith, a wheel supporting block having an ear formed thereon disposed between the ears of said plate, means adjustably securing said block between the ears, said block having upper and lower longitudinally convexed surfaces and a longitudinal transverse slot therein, a wheel supporting rod pivoted in said slot for transverse movement to angularly position the wheel in the furrow, a plurality of oppositely disposed recesses in the under side of the block communicating with the slot, and a circular nut threaded on the end of said rod adapted to engage in said recesses and bind against the block to secure the wheel in its adjusted position.

In testimony whereof I hereunto affix my signature in the presence of two witnesses.

EWELL MONROE DOWDY.

Witnesses:
W. S. ARMSTRONG,
J. G. COOPER.